United States Patent [19]
Coy et al.

[11] Patent Number: 5,751,123
[45] Date of Patent: May 12, 1998

[54] METHOD OF DIAGNOSING A DRIVE TRAIN HAVING MULTIPLE SERVO MOTORS

[75] Inventors: Gerald L. Coy, Webster; Neil J. Dempsey, Victor, both of N.Y.

[73] Assignee: Xerox Corporation, Stamford, Conn.

[21] Appl. No.: 786,587

[22] Filed: Jan. 21, 1997

[51] Int. Cl.⁶ .................................................. H02P 7/67
[52] U.S. Cl. .................................................. 318/34; 318/625
[58] Field of Search .................................. 318/625, 34, 39, 318/41, 45, 46, 51, 53

[56] References Cited

U.S. PATENT DOCUMENTS

| | | |
|---|---|---|
| 3,653,210 | 4/1972 | Mochizuku et al. |
| 4,429,333 | 1/1984 | Davis et al. .................... 358/293 |
| 4,451,030 | 5/1984 | Teeter et al. .................... 271/265 |
| 4,536,077 | 8/1985 | Stoffel ............................. 355/8 |
| 4,571,636 | 2/1986 | Itoh ................................. 358/285 |
| 4,673,285 | 6/1987 | Shogren .......................... 355/23 |

OTHER PUBLICATIONS

Xerox Disclosure Journal, vol. 8, No. 3, May/Jun. 1983, p. 263.

*Primary Examiner*—Bentsu Ro
*Attorney, Agent, or Firm*—John M. Kelly

[57] ABSTRACT

Automated diagnosis of drive trains having electrically operated components based upon the ability of a first servo motor to rotate a second servo motor when both servo motors are selectively coupled to the drive train. Beneficially, the status of the drive train is sent to a remote location using a data link.

11 Claims, 6 Drawing Sheets

METHOD OF DIAGNOSING A DRIVE TRAIN HAVING MULTIPLE SERVO MOTORS

FIELD OF THE INVENTION

The present invention relates to diagnosing drive train problems. In particular, it relates to diagnosing servo motor driven drive trains by using feedback from multiple servo motors. The present invention is particularly useful in diagnosing servo motor driven drive trains that move documents.

BACKGROUND OF THE INVENTION

Document handlers that move documents across input scanning stations have been known and used for many years. Modern document handlers are able to move more than 50 documents per minute past an input scanning station. Generally, document handlers include a constant velocity transport (CVT) that moves documents at a constant velocity across the input scanning station and of a feeder transport that moves documents from an input tray into the CVT document transport.

Some document handlers move documents such that both sides of a document are scanned. This is often called duplex scanning. While various types of duplex scanners are possible, it is common to use a turn buckle to invert the document being scanned so that the second side can be passed across the imaging station. This avoids the need for two imaging stations, one for each side of the document. When turn buckles are used to reduce costs, it is common to use electrically operated clutch mechanisms and solenoids to selectively engage and disengage document transport components so as to achieve document feeding, scanning and reversing. While a document handling system for feeding, scanning, and reversing a document is described subsequently, briefly, that system includes servo motors that, in conjunction with an electronic controller that selectively engages various drive train components, drive a drive train to achieve the desired functions.

As scanners, printers, copiers, facsimile machines and other document handling devices evolve, it becomes increasingly important to provide faster, yet more reliable and more automatic document handlers. Achieving these goals is difficult, partially because documents come in a variety of sizes, types, weights, thickness, materials, conditions, and susceptibility to damage. Furthermore, documents may have curls, wrinkles, tears, "dog-ears", cut-outs, overlays, tape, paste-ups, punched holes, staples, adhesive or slippery areas, or other irregularities. Documents also may have typing, smearable inks, freshly printed ink jet printer output, fuser oil or other materials thereon that are susceptible to smearing or contamination by document handlers. Therefore, handling original documents, particularly delicate, valuable, thick or irregular documents, is frequently much more difficult and critical than feeding blank copy sheets.

Further complicating document handling is that proper registration and timing of documents is very important. If the document is not properly fed and registered, then undesirable dark borders and/or edge shadow images may result in the digitized image, or information near an edge of the document may be lost, i.e., not imaged. Document misregistration, especially skewing, can also adversely affect feeding, ejection, and/or restacking of the documents.

From the above, it can be seen that proper operation of document handlers is very important. Unfortunately, it is not always easy to diagnose problems that occur in the overall document transport system. The large number of drive train components, as well as their interactions and their locations, which tend to be hidden within the body of the machines which use the document handlers, make drive train problem diagnosis difficult and time consuming. Because many machines that use document handlers are very important to their owners and operators, excessive downtime can be costly and inconvenient. Therefore, an automated method of diagnosing document transport systems that use servo motors and electrically operated clutches would be beneficial. Furthermore, because of the variety and complexity of modern machines that use document handlers, it is not always convenient to bring all of the components, supplies, tools, and manuals required to service any problem of a machine being serviced. Therefore, an automated method of diagnosing document transport systems that could be run remotely would be even more beneficial since a repair technician could then bring the required items for the service call.

Informative references on document handlers include Xerox Corp. U.S. Pat. No. 4,536,077 issued Aug. 20, 1985 to James C. Stoffel; Xerox Disclosure Journal (XDJ) publication dated May/June 1983 by Richard E. Smith, Vol. 8, No. 3, p. 263; Xerox Corp. U.S. Pat. No. 4,673,285 issued 1987 to Shogren; Mead Corp. Davis et al, U.S. Pat. No. 4,429,333, issued in 1984; U.S. Pat. No. 4,571,636, assigned to Fuji Xerox, issued Feb. 18, 1986, filed Dec. 21, 1983, based on Japanese App. 57-222904 filed Dec. 21, 1982, entitled "Device for reading images of both surfaces of an original in one pass;" Xerox Corp. U.S. Pat. No. 4,451,030 by D. Teeter, et al., and the citations therein.

SUMMARY OF THE INVENTION

The principles of the present invention provide for the diagnosis of problems in servo motor driven drive trains, beneficially in a manner such that the status of the drive train and a diagnosis of any drive train problems are available at a remote location. A method according to the principles of the present invention provides for diagnosing a drive train by selectively and automatically engaging and disengaging various electrically operated drive train components, such as electrically controllable clutches, and by selectively driving the drive train using one of a plurality of servo motors. The method includes the steps of determining whether any one of a plurality of servo motors are operational, of sending an error signal if one does not, of selectively engaging drive train problems so as to couple an operational servo motor and at least one more servo motor to the drive train, of determining whether an operational servo motor can rotate another servo motor, and of sending an error signal if an operational servo motor cannot. Beneficially, if an operational servo motor cannot rotate another servo motor coupled to the drive train, a determination is made as to whether the operational servo motor turns with the other servo motor coupled to the drive train. If not, an error signal is sent.

Beneficially, if a plurality of servo motors are operational, selected drive train components are engaged so as to couple at least two operational servo motors together, then one of the coupled servo motor is energized to determine whether one operational operating servo motor can rotate another. If not, an error message is sent. However, if an operational servo motor can rotate another, drive train components are selectively disengaged and engaged to determine that each component properly couples and uncouples the servo motors together.

Beneficially, the principles of the present invention include the step of communicating the status of the drive train to a remote location using a data link.

3

The principles of the present invention further provide for a document handler having a plurality of servo motors; a plurality of encoders, each operatively couples to an associated servo motor and each for generating encoder signals from the rotation of its associated servo motor; a drive train that includes electrically operable clutches; and a controller. The controller selectively energizes the servo motors and monitors encoder signals to determining which servo motors are operational. The controller sends an error signal if any servo motor is not operational. The controller selectively engages the clutches to couple an operating servo motor to a non-operating servo motor. The controller determines whether the operational servo motor can rotate the non-operating servo motor. If not, the controller signals an error. Beneficially, if an operational servo motor cannot rotate a non-operating servo motor, the controller determines from the encoder signals associated with the operational servo motor whether the operational servo motor still turns. If not, the controller sends an error signal. Beneficially, if a plurality of servo motors are operational, the controller selectively engages said clutches such that at least two operational servo motors are coupled together. Then, the controller energizes one of the operational servo motors and monitors encoder signals from the non-energized servo motor to determine that the energized servo motor can rotate the non-energized servo motor. If not, the controller sends an error message. However, if the energized servo motor can rotate the other servo motor, the controller selectively engages and disengages the clutches to determine that each clutch can couple and uncouple the servo motors together. If a clutch cannot, the controller sends an error message.

Beneficially, the document handler further includes a data terminal for transmitting error messages to a remote location.

BRIEF DESCRIPTION OF THE DRAWINGS

Various features and advantages of the present invention will be apparent from the specific apparatus and its operation described in the example below, as well as the claims, particularly when taken in conjunction with the following drawings in which:

DETAILED DESCRIPTION OF THE PREFERRED EMBODIMENT

Figure 1:
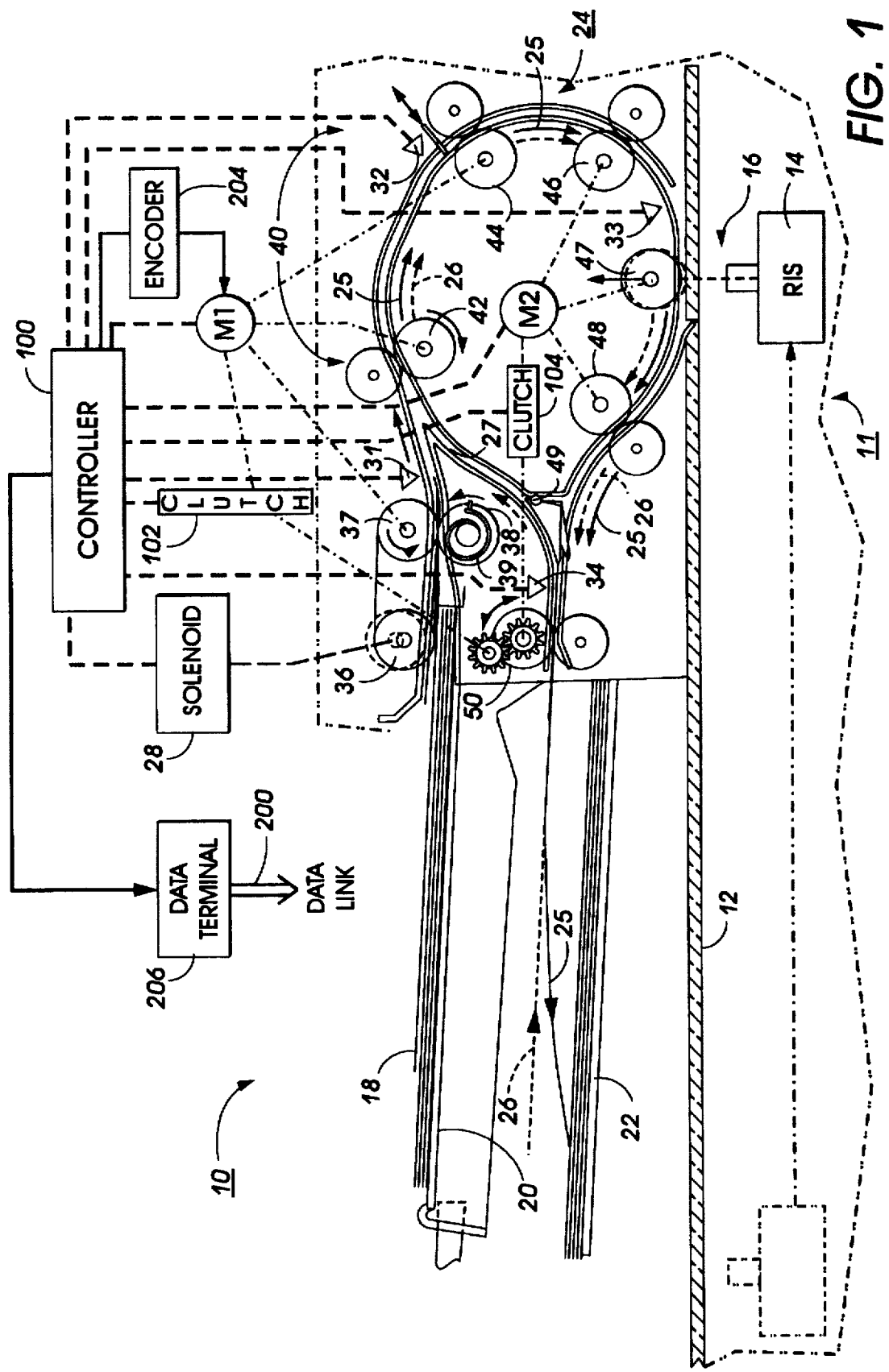
FIG. 1 is a partially schematic front view of an exemplary compact document handling system suitable for use with the subject invention.

The principles of the present invention provide for automated testing of servo motor drive trains systems by using feedback from a plurality of servo motors. FIG. 1 presents an exemplary embodiment of a document handler 10 that incorporates those principles. The document handler 10, which is of the type frequently used in electronic copiers and scanners, provides for duplex imaging. It is desirably pivotal about a pivot axis at the rear of a module 11. Such pivoting is common for document handlers because pivoting exposes an imaging platen 12 onto which an operator can optionally manually place a document for imaging. A document on the platen 12, whether manually placed or automatically feed, is scanned by a raster input scanner, or RIS, 14, at an imaging station 16.

To operate the document handler using document feeding an operator loads documents 18 face up and in normal order in the document input tray 20. The document handler then automatically feeds the documents through a short, highly compact, "U" shaped document path 24 for imaging by the RIS. After simplex imaging a document, that document is fed directly into an output tray 22 in a face down configuration. However, there is a difference in the document paths for simplex scanned documents and duplex scanned documents. This is illustrated by solid arrows that represent the simplex document path 25 and by dashed arrows that represent the duplex path 26. It should be noted that the U-shaped document path 24 itself contains a single natural inversion for turning each document sheet over once between its feeding from input tray 20 and the imaging station 16. This is the only inversion in document path 25.

Note however that both simplex and duplex documents are ejected and restacked in the same document output tray 22 after copying. As shown in FIG. 1, the input tray 20 is closely superimposed above the document output tray 22. That is, the two trays closely overly one another to form a relatively small enclosed space between the two trays. This space provides a protected, space saving inverter chute for duplex documents while they are being inverted.

Document movement is achieved using a feeder servo motor M1, a constant velocity transport (CVT) system having a CVT servo motor M2, and associated drive train components. Overall document motion is controlled by a controller 100, which may be of the type known in the prior art and may include one or more microprocessors or microcontrollers. Connecting to the controller 100 in a conventional manner are sheet path sensors, such as sensors 31, 32, 33, and 34, for detecting the leading and/or trailing edge of documents being through the document handler 10. Based upon the states of the sensors the controller selectively controls the feeder servo motor M1, the CVT servo motor M2, a nudger solenoid 28 that selectively lifts a nudger roll 36 onto and off of documents 18 in the input tray, a feeder clutch 102, and a CVT clutch 104. The sheet path sensors provide the controller with information about specific positions of documents within the document handler. Because a document moves at a known speed, its position can be predicted by simple timing in a well known manner.

As previously stated, the nudger solenoid 28, a part of the feeder system, sequentially moves a nudger roll into contact with the top document in the input tray 20. When the nudger roll 36 contacts the top document, that document, and possibly others, are driven into a positive retard separating nip comprised of a driven first feeder roll 37 and an undriven retard roll 38. The driven feeder roll 37 rotates to feed the top-most document into the document path 24, while subsequent or underlying documents are retarded by the retard roll 38. To prevent wear spots on the retard roll 38, that roller is allowed some limited rotational movement. However, this retard roller rotation is resisted by a connected return spring 39.

After the top document has been fully acquired and fed downstream past the sensor 31, the nudger roll 36 may be lifted to prevent an inadvertent feeding of another document and to prevent smearing of document images. By having the feeder solenoid 28 lift the nudger roll 36 after document acquisition, rather than simply mechanically camming the nudger roll away, optimized timing can be implemented to ensure nudger roll engagement without smearing.

Once a document has passed the feeder roll that document passes through a drive subsystem 40 of the feeder system. The operation of the drive subsystem will be described with reference to the rollers that are driven by the feeder servo motor M1, although mating and nip-defining idler rollers are also illustrated. As shown in FIG. 1, the drive subsystem is comprised of, in order: second or take-away rollers 42 and registration rollers 44 downstream thereof, (optionally with an intermediate sheet deskew buckle chamber therebetween). Those rollers advance the document along the U-shaped path and into the CVT system. It should be noted that the various components driven by the feeder servo motor are connected together by a drive shaft (which is not shown for clarity).

The CVT system includes a first CVT roller 46, a second CVT roller 47 that hold a document against the imaging station 16, and a third CVT roller 48. Those rollers are all driven by the CVT motor M2. That motor is preferably a servo-motor capable of providing controlled driving of those rollers so as to provide an accurate constant velocity transport of a document across the RIS 14. Also driven by the CVT motor M2 via the CVT clutch 104 is a reversible exit nip roller 50, which is at the entrance to the output tray 22 and is past a gate 49. The gate 49 is located at the downstream end of the U-shaped document path 24, just upstream of the reversible exit nip roller 50 and at the entrance of the duplex document path 27. Significantly, the gate 49 passes documents coming from the imaging station 16, irrespective of whether they are duplex or simplex documents.

It should be understood that the document handler 10 is capable of driving a document such that both sides pass over the imaging station 16. While a document sheet is being driven the rollers 46, 47, 48, and 50 all propel the document toward the output tray 22 at the same rate. When the leading edge of the document reaches the gate 49 that gate directs the document into the exit nip roller 50 and thus into the output tray 22. However, when a document is to be duplex scanned, the sensor 34 senses when the trailing edge of a document pass the gate 49. At that time the gate 49 falls down into the position shown in phantom in FIG. 1. The controller 100 then causes the CVT clutch 104 to disconnect the exit nip roller 50 from the CVT motor M2, and also causes the feeder clutch 102 to connect the exit nip roller 50 to the feeder motor M1 via a simple reverse gear drive. The feeder motor M1 then drives the document backwards toward the gate 49. However, a front lip of the gate 49 directs the document along duplex path 27. The duplex path 27 forms a return path for duplex documents into the entrance of the U-shaped path 24. In its next pass through the imaging station the second side of the document is imaged.

Figure 2:
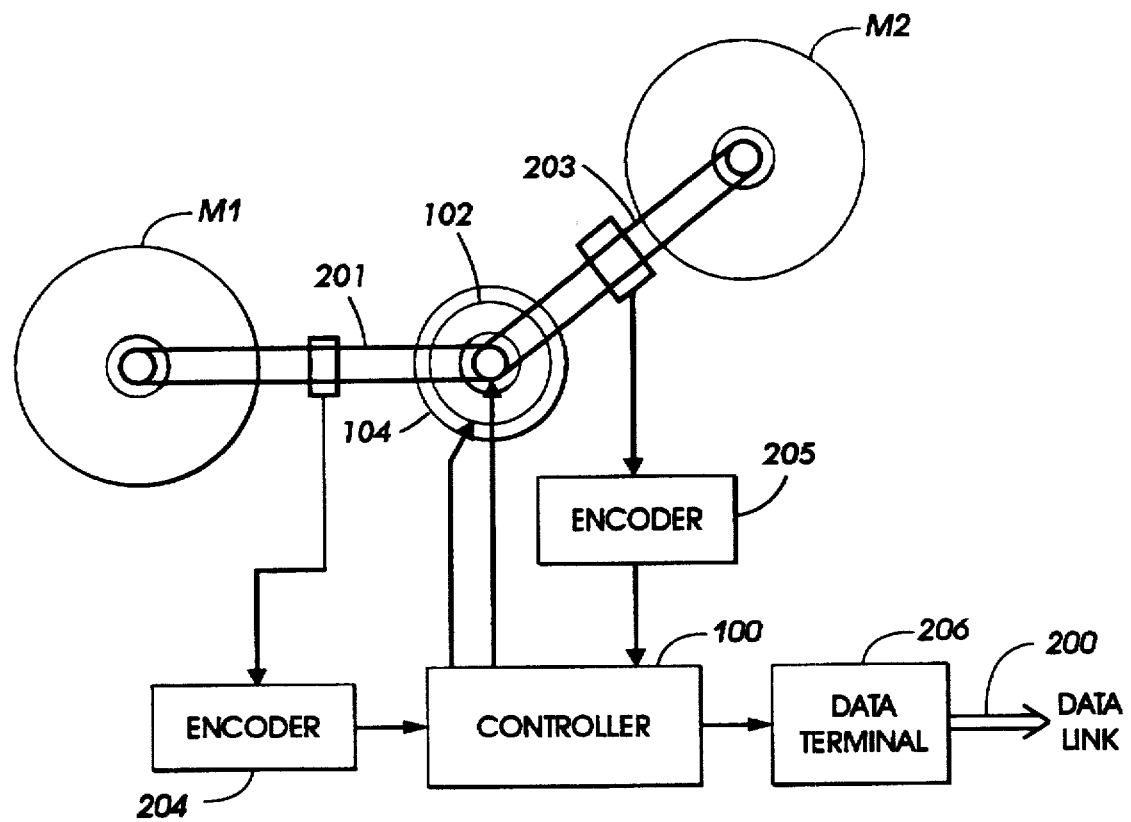
FIG. 2 is a schematic depiction of the feeder motor drive train used in the document handling system of FIG. 1.

The document handler 10 is a small, compact, reliable, and relatively inexpensive document handler that has the ability to diagnose document handling problems. The diagnostic capability is explained with the assistance of FIG. 2, which is a schematic depiction of a set of components important in the diagnosis of drive train problems and for the communication of the status of the drive train to remote locations via a data link 200. FIG. 2 specifically shows the feeder servo motor M1 coupled to the feeder clutch 102 and the CVT servo motor M2, that is to be understood as being coupled to the CVT clutch 104. It is to be remembered from the foregoing description, and from FIG. 1, that the feeder clutch and the CVT clutch can be operated to selectively couple the servo motors M1 and M2 so that each servo motor can drive the roller 50. Significantly, those servo motors and clutches can also be selectively operated such that either servo motor can drive the other. For example, by coupling both of the clutches to the roller 50, by applying electrical power to the feeder servo motor M1, and by not applying electrical power to the CVT servo motor M2, the feeder servo motor M1 and cause the CVT servo motor to turn.

Turning once again to FIG. 2, an encoder 204 is coupled to the shaft 201 and an encoder 205 is coupled to the shaft 203. Those encoders beneficially include either an optical or a magnetic based rotational sensor that monitors the rotation of the servo motors M1 and M2. The outputs of the encoders are applied to the controller 100, which, as explained above, controls the motion of document through the document handler by controlling the operation of the drive train components. Additionally, the controller also operates a data terminal 206, such as a modem, such that the status of the drive train, and a diagnosis of any drive train problems, is available at a remote location. It should be understood that, individually, each of the components shown in FIG. 2 are well known in the art.

Figure 3:
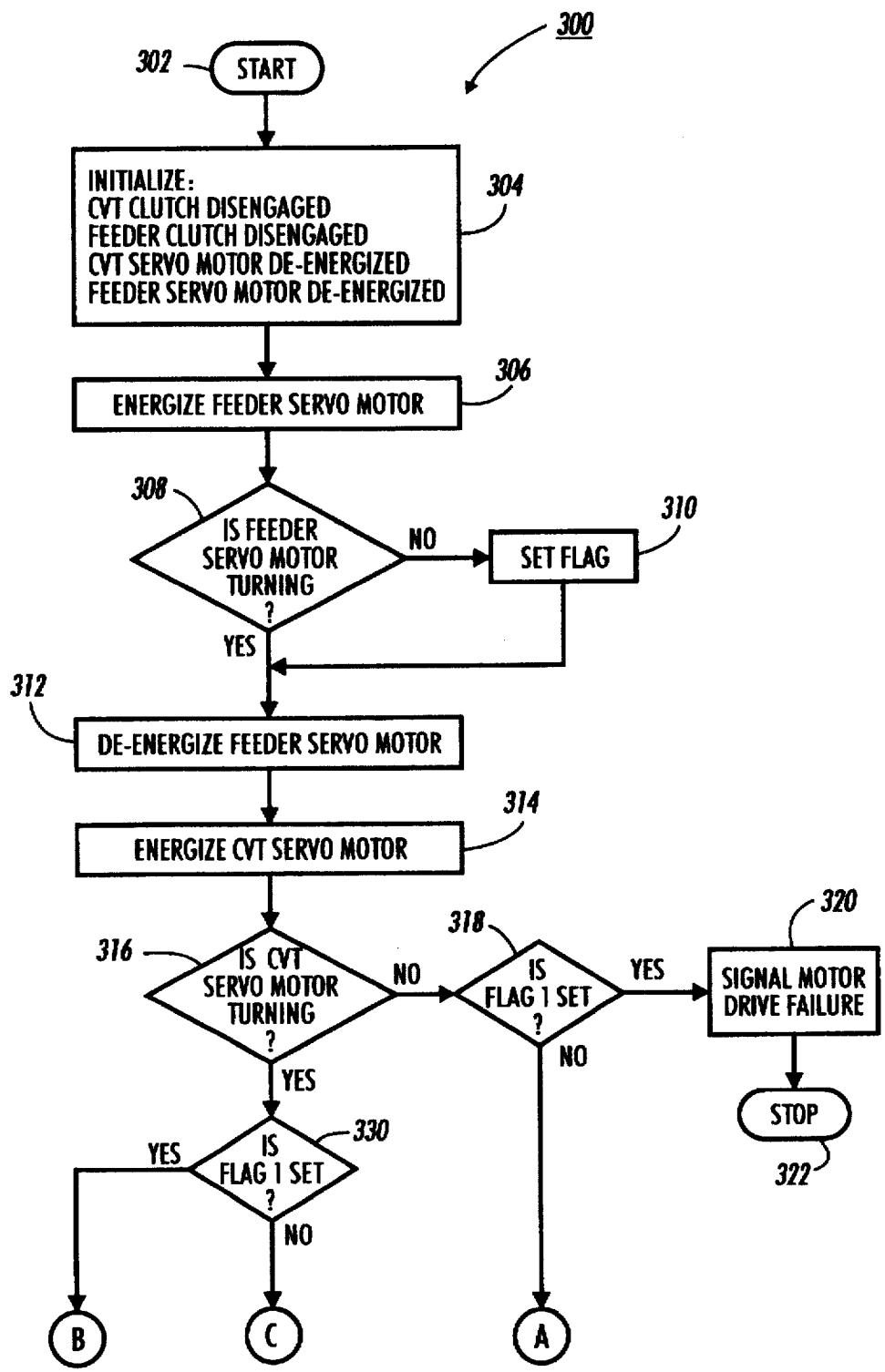
FIG. 3 is a flow diagram of a first part of a method of testing the feeder motor drive train of FIG. 2.

FIGS. 3, 4, 5, and 6 present a flow diagram of a diagnostic routine 300 that is run by the controller 100. The diagnostic routine 300 automatically diagnoses the drive train as explained below and transmits the status of that drive train and, if appropriate, a diagnosis of any drive train problems to a remote location. Turning now specifically to FIG. 3, the diagnostic routine starts, step 302. Starting is beneficially performed as a result of either an operator based command (such as by entering a test code at a terminal) or upon receipt of a test code over the data link 200. If starting is a result of a test code received on the data link, the controller 100 decodes the test code and starts the diagnostic routine 300.

After the diagnostic routine 300 starts, the controller attempts to initialize the state of the drive train to a predetermined condition, step 304. That condition includes having the feeder servo motor M1 and the CVT servo motor M2 de-energized, and the feeder clutch and the CVT clutch disengaged from the roller 50.

After initialization the drive train components of FIG. 2 are presumably in known states. The controller 100 then energizes the feeder servo motor M1, step 306, and the output of the encoder 204 is checked to determined whether M1 is turning, step 308. If M1 is not turning the controller 100 diagnoses a non-operating feeder servo motor M1 and sets a Flag, step 310. The use of that flag is discussed subsequently. Whether or not the flag is set, the diagnostic routine 300 de-energizes the feeder servo motor, step 312, and energizes the CVT servo motor M2, step 314. The output of the encoder 205 is then checked to determined whether M2 is turning, step 316.

If the CVT servo motor is not turning the status of the flag is checked, step 318. If the flag is set, a determination is then made that, since neither servo motor rotates, a servo motor drive failure has occurred. The controller 100 then controls the data terminal so as to transmit that diagnosis to the remote location, step 320 and the diagnostic routine 300 then stops, step 322. At this time, a service technician can rationally deduce possible causes of the problem (a defective power supply, defective servo motor drives, a controller malfunction, etc.)

However, if step 318 shows that the flag is not set, the status of the drive train is that the feeder servo motor turns but the CVT servo motor does not. The diagnostic routine then proceeds as shown on FIG. 4 and described subsequently. If, however, in step 316 the CVT servo motor was found to be turning, the status of the flag is checked, step 330. If the flag is set, the status of the drive train is that the CVT servo motor turns, but the feeder servo motor does not. The diagnostic routine then proceeds as shown on FIG. 5 and described subsequently. However, if in step 330 the flag was not set, the status of the drive train is that both servo motors turn under the control of the controller 100. The diagnostic routine then proceeds as shown in FIG. 6 and described subsequently.

Figure 4:
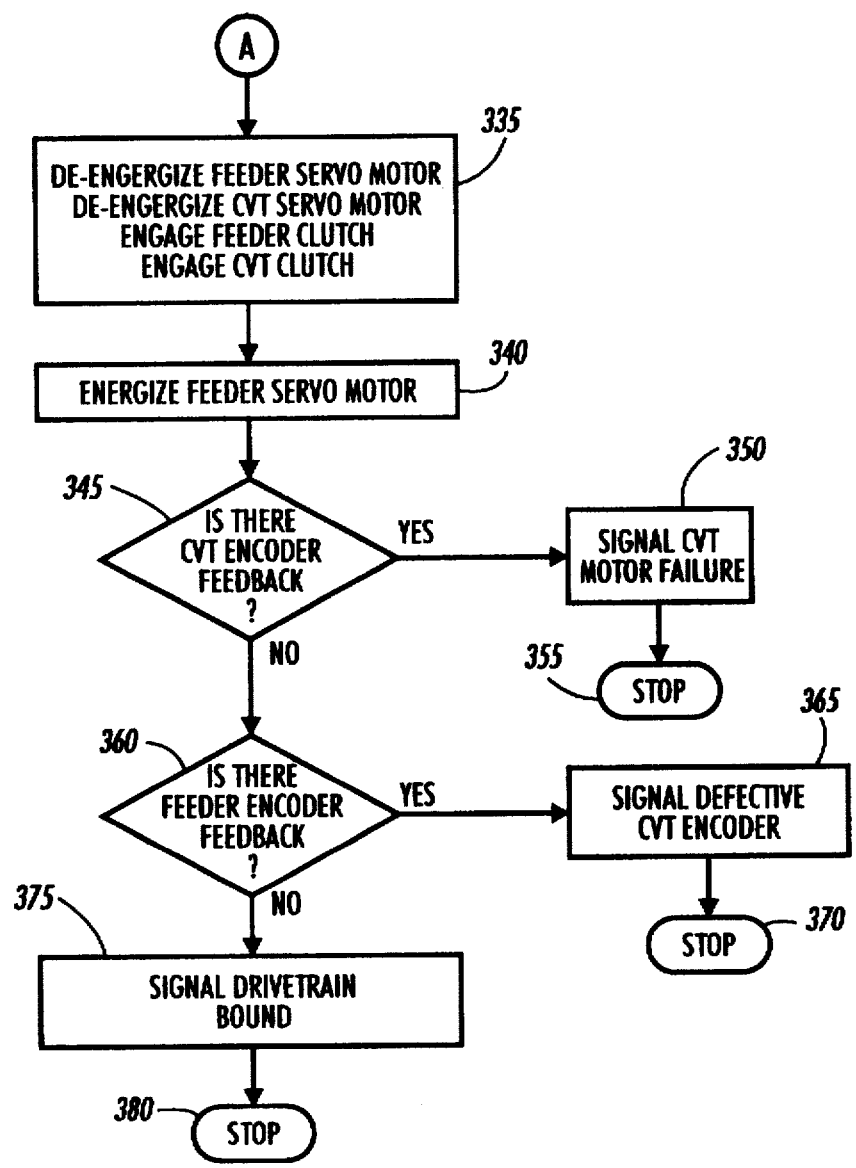
FIG. 4 is a flow diagram of a second part of the method of testing the drive train started in FIG. 3.

Turn now to FIG. 4, wherein the steps of the diagnostic routine 300 when step 318 indicates that the feeder servo motor turns but the CVT servo motor does not are shown. The controller 100 controls the drive train components such that the CVT and feeder servo motors are de-energized and such that both the CVT and the feeder clutches are engaged with the roller 50, step 335. The feeder servo motor is then energized, step 340, and the encoder 203 is checked to determine if the CVT servo motor is turning, step 345. If the CVT servo motor is turning the drive train problem is diagnosed as being a non-operating CVT servo motor. The controller transmits that diagnosis to the remote location, step 350 and the diagnostic routine stops, step 355. At this time, a service technician can rationally deduce possible causes of the problem (defective CVT servo motor, defective CVT servo motor drive, etc.).

However, if in step 345 the CVT encoder did not indicate that the CVT servo motor was turning the controller 100 checks the output of the encoder 204 to determine if the feeder servo motor is turning, step 360. If encoder 204 indicates that the feeder servo motor is turning a diagnosis is made that the probable status of the drive train is a defective encoder 203. The controller 100 transmits that diagnosis to the remote location, step 365, and the diagnostic routine stops, step 370. At this time, a service technician can rationally deduce possible causes of the problem (defective encoder 203, defective wiring/connection, etc.). However, if in step 360 the encoder 204 indicates that the feeder servo motor is not turning, a diagnosis is made that the probable status of the drive train is a bound drive train. The controller 100 transmits that diagnosis to the remote location, step 375, and the diagnostic routine stops, step 380. At this time, a service technician can rationally deduce possible causes of the problem (mechanical binding, excessive wear, excessive debris, etc.).

Figure 5:
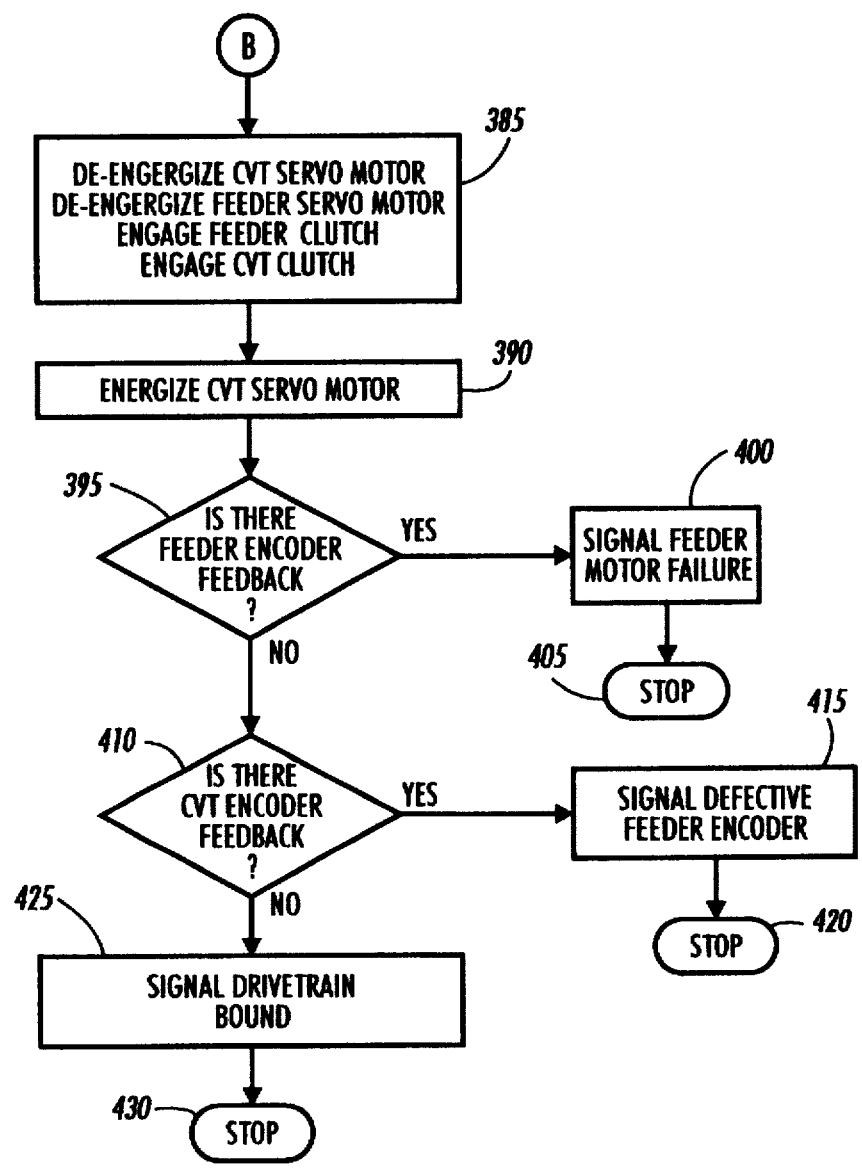
FIG. 5 is a flow diagram of a second part of the method of testing the drive train started in FIG. 3.
Figure 6:
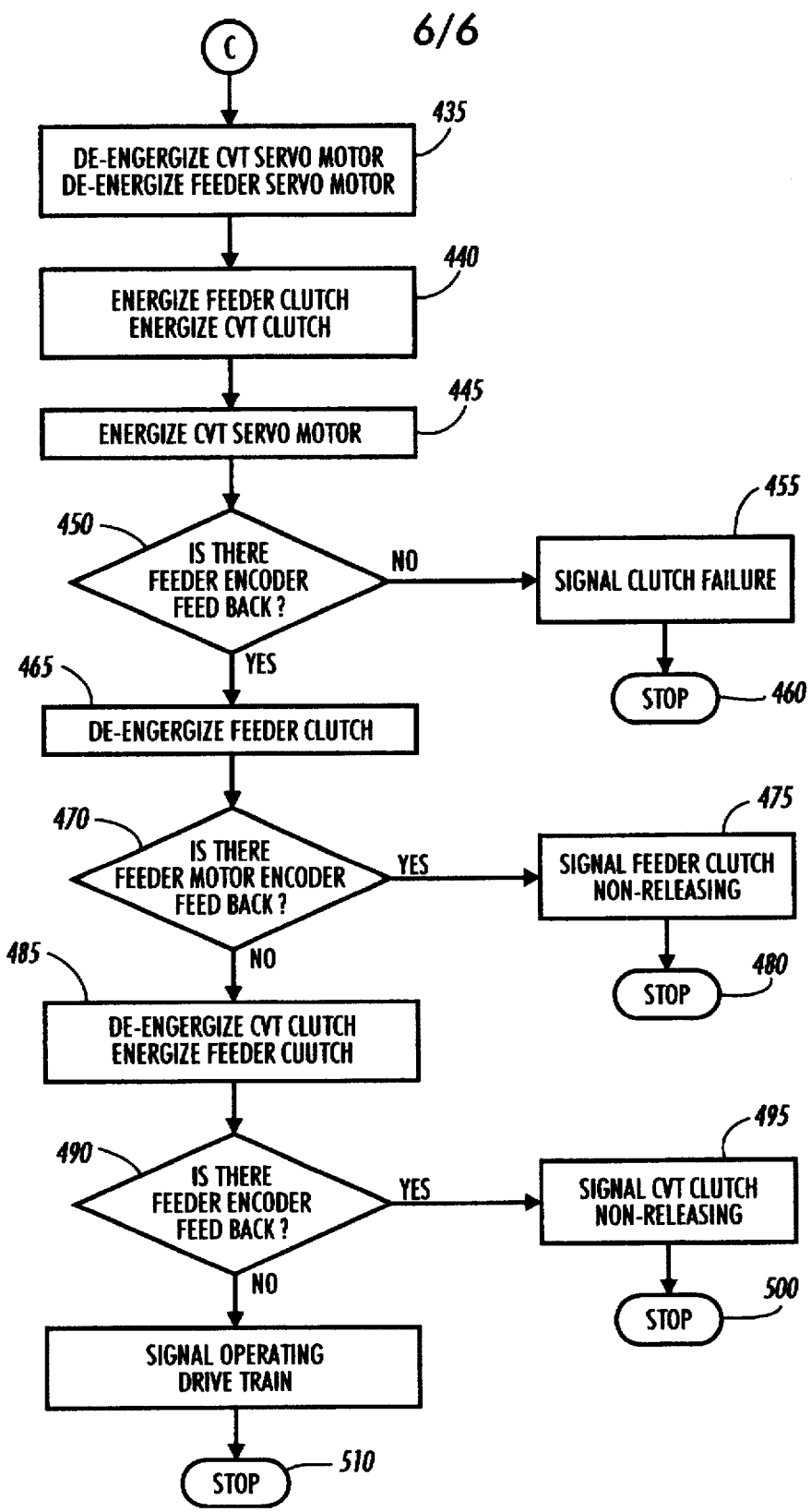
FIG. 6 is a flow diagram of a second part of the method of testing the drive train started in FIG. 3.

Turn now to FIG. 5, wherein the steps of the diagnostic routine when step 330 indicates that the CVT servo motor turns, but that the feeder servo motor does not are shown. The controller 100 controls the drive train components such that the CVT and feeder servo motors are de-energized and such that both the CVT and the feeder clutches are engaged with the roller 50, step 385. The CVT servo motor is then energized, step 390, and the encoder 204 is checked to determine if the feeder servo motor is turning, step 395. If the feeder servo motor is turning a diagnosis is made that the probable status of the drive train includes a non-operating feeder servo motor. The controller 100 transmits that diagnosis to the remote location, step 400, and the diagnostic routine stops, step 405. At this time, a service technician can rationally deduce possible causes of the problem (defective feeder servo motor, defective feeder servo motor drive, etc.).

However, if in step 395 the feeder encoder did not indicate that the feeder servo motor was turning the controller 100 checks the output of the encoder 203 to determine if the CVT servo motor is still turning, step 410. If encoder 203 indicates that the CVT servo motor is still turning a diagnosis is made that the probable status of the drive train includes a defective encoder 204. The controller 100 transmits that diagnosis to the remote location, step 415, and the diagnostic routine stops, step 420. At this time, a service technician can rationally deduce possible causes of the problem (defective encoder 204, defective wiring/connection, etc.).

However, if in step 410 the encoder 203 indicates that the CVT servo motor is not turning, a diagnosis is made that the probable status of the drive train includes a bound drive train. The controller 100 transmits that diagnosis to the remote location, step 425, and the diagnostic routine stops, step 430. At this time, a service technician can rationally deduce possible causes of the problem (mechanical binding, excessive wear, excessive debris, etc.).

Turning now to FIG. 6, the steps of the diagnostic routine 300 when step 330 indicates that both servo motor are functioning will be described. The controller 100 controls the drive train components such that the CVT and feeder servo motors are de-energized, step 435 and such that both the CVT and the feeder clutches are engaged with the roller 50, step 440. The CVT servo motor is then energized, step 445, and encoder 204 is checked to determine if the feeder servo motor is turning, step 450. If the feeder servo motor is not turning the drive train is diagnosed as having a non-operating clutch. The controller 100 transmits that diagnosis to the remote location, step 455, and the diagnostic routine stops, step 460. At this time, a service technician can rationally deduce possible causes of the problem (defective feeder clutch, defective CVT clutch, defective wiring, etc.).

However, if in step 450 the feeder encoder indicated that the feeder servo motor is turning the controller 100 de-energizes the feeder clutch but retains the energizing of the CVT clutch and the CVT servo motor, step 465. The controller then checks the output of the encoder 204 to determine if the feeder servo motor is still turning, step 470. If the feeder servo motor is turning the drive train is diagnosed as having a non-releasing feeder clutch. The controller 100 transmits that diagnosis to the remote location, step 475, and the diagnostic routine stops, step 480. At this time, a service technician can rationally deduce possible causes of the problem (defective feeder clutch, defective controller, etc.).

If in step 470 the encoder 204 indicates that the feeder servo motor is not turning, the controller dis-engages the CVT clutch and engages the feeder clutch, step 485. The encoder 204 is then checked to determine if the feeder servo motor is turning, step 490. If the feeder servo motor is turning the drive train problem is diagnosed as having a non-releasing CVT clutch. The controller 100 transmits that diagnosis to the remote location, step 495, and the diagnostic routine stops, step 500. At this time, a service technician can rationally deduce possible causes of the problem (defective CVT clutch, defective controller, etc.).

Finally, if in step 490 the encoder indicates that the feeder servo motor is not turning, the controller transmits to the remote location that the drive train is operational, step 505. The subroutine 300 then ends, step 510.

While the embodiment disclosed herein is preferred, it will be appreciated from this teaching that various alternatives, modifications, variations or improvements therein may be made by those skilled in the art. Therefore, the principles of the present invention are intended to be encompassed by the following claims:

What is claimed is:

1. A method of diagnosing faults in a drive train having electrically operable components that selectively couples sections of said drive train together and that is selectively driven by any servo motor of a plurality of servo motors, that method comprising the steps of:

(a) determining which of a plurality of servo motors is not operational;

(b) sending an error signal if any servo motor is not operational;

(c) if at least one servo motor is operational, selectively engaging drive train components so as to couple an operational servo motor and another servo motor together via the drive train and of determining whether said operational servo motor can rotate said another servo motor.

2. A method according to claim 1, wherein if in step (c) said operational servo motor cannot rotate said another servo motor an error message is produced.

3. A method according to claim 2, wherein if in step (c) an operational servo motor cannot rotate said another servo motor, said error message depends upon whether the operational servo motor turns.

4. A method according to claim 1, wherein if in step (c) said operational servo motor can rotate said another servo motor that:

(d) a drive train component is disengaged;

(e) a determination is made as to whether said another servo motor is uncoupled from said operational servo motor; and (f) if said another servo motor remains coupled to said operational servo motor an error message is sent.

5. The method according to claim 2, wherein said error message is transmitted over a data link to a remote location.

6. A servo motor driven drive train, comprising:

a first servo motor;

a second servo motor;

a first encoder coupled to said first servo motor for producing first encoder signals when said first servo motor turns;

a drive train having selectively engaged, electrically operable drive train components that couple said first servo motor and said second servo motor to each other via said drive train components; and a controller operatively connected to said first servo motor, to said first encoder, to said second servo motor, and to said electrically operable drive train components;

wherein said controller selectively operates said electrically operable train components such that both said first and said second servo motors are coupled together, for selectively energizing said second servo motor, for determining from said first encoder signals whether said first servo motor turns, and for identifying a first drive train fault if the first servo motor does not turn.

7. The servo motor driven drive train according to claim 6, further including a data transmitter, operatively connected to said controller, for transmitting said first drive train fault information to a remote location.

8. The servo motor driven drive train according to claim 6, wherein said selectively engaged, electrically operable drive train component is a clutch.

9. The servo motor driven drive train according to claim 6, wherein if said first servo motor turns that said controller disengages a drive train component and wherein said controller identifies a second drive train fault if the first servo motor continues to turn with said drive train component disengaged.

10. A document feeder for moving a document from an input bin across an imaging sensor, comprising:

a first servo motor;

a second servo motor;

a first encoder coupled to said first servo motor for producing first encoder signals when said first servo motor turns;

a drive train having selectively engaged, electrically operable drive train components that couple said first servo motor and said second servo motor to each other via said drive train components; and a controller operatively connected to said first servo motor, to said first encoder, to said second servo motor, and to said electrically operable drive train components;

wherein said controller selectively operates said electrically operable drive train components such that both said first and said second servo motors are coupled together, for selectively energizing said second servo motor, for determining from said first encoder signals whether said first servo motor turns, and for identifying a first drive train fault if the first servo motor does not turn.

11. A document feeder according to claim 10, further including a data transmitter, operatively connected to said controller, for transmitting drive train fault information to a remote location.

* * * * *